US009227788B2

(12) United States Patent
Voigt

(10) Patent No.: US 9,227,788 B2
(45) Date of Patent: Jan. 5, 2016

(54) CHAIN WHEEL FOR APRON CONVEYOR

(71) Applicant: Caterpillar Global Mining Europe GmbH, Lünen (DE)

(72) Inventor: Robert Voigt, Bochum (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 0 days.

(21) Appl. No.: 14/439,537

(22) PCT Filed: Oct. 15, 2013

(86) PCT No.: PCT/EP2013/003104
§ 371 (c)(1),
(2) Date: Apr. 29, 2015

(87) PCT Pub. No.: WO2014/067620
PCT Pub. Date: May 8, 2014

(65) Prior Publication Data
US 2015/0284188 A1    Oct. 8, 2015

(30) Foreign Application Priority Data

Nov. 2, 2012  (DE) .......................... 20 2012 104 212

(51) Int. Cl.
*B65G 23/06* (2006.01)
*B65G 17/34* (2006.01)
(Continued)

(52) U.S. Cl.
CPC ................ *B65G 23/06* (2013.01); *B65G 17/12* (2013.01); *B65G 17/22* (2013.01); *B65G 17/34* (2013.01); *B65G 17/44* (2013.01)

(58) Field of Classification Search
CPC .... B65G 17/065; B65G 17/066; B65G 17/12; B65G 17/123; B65G 17/22; B65G 17/34; B65G 17/38; B65G 17/385; B65G 17/44; B65G 23/06
See application file for complete search history.

(56) References Cited

U.S. PATENT DOCUMENTS 4,095,478 A * 6/1978 Rynik ........................... 474/155
4,339,031 A * 7/1982 Densmore .................. 198/861.2
(Continued)

FOREIGN PATENT DOCUMENTS

DE    506420 C    9/1930
DE    2318923 A1    10/1974
(Continued)

OTHER PUBLICATIONS

International Search Report mailed Jan. 29, 2014, in Application No. PCT/EP2013/003104 issued by the European Patent Office (2 pages).
(Continued)

Primary Examiner — Leslie A Nicholson, III
Assistant Examiner — Keith R Campbell

(57) ABSTRACT

A chain wheel for driving or diverting a conveyor of an apron conveyor including transport plates is disclosed. The transport plates may be releasably connectable via a chain connecting parts to the conveyor chain. The chain wheel may have a chain wheel body including a lateral face. The chain wheel may also have teeth arranged peripherally offset over the lateral face. In addition, the chain wheel may have bearing faces. The bearing faces may be arranged peripherally offset over the lateral face between two adjacently situated teeth. The bearing faces may also be configured to support the chain connecting parts.

20 Claims, 3 Drawing Sheets

(51) Int. Cl.
*B65G 17/44* (2006.01)
*B65G 17/12* (2006.01)
*B65G 17/22* (2006.01)

(56) References Cited

U.S. PATENT DOCUMENTS

| | | | |
|---|---|---|---|
| 4,567,980 A | 2/1986 | Pirovano | |
| 4,708,698 A * | 11/1987 | Ziegelmeyer | 474/152 |
| 4,828,339 A * | 5/1989 | Thomas et al. | 305/202 |
| 5,074,827 A * | 12/1991 | Bandy, Jr. | 474/157 |
| 5,170,882 A * | 12/1992 | Tekathen et al. | 198/731 |
| 5,228,557 A * | 7/1993 | Lago | 198/778 |
| 5,389,044 A * | 2/1995 | Bandy et al. | 474/96 |
| 6,651,804 B2 * | 11/2003 | Thomas et al. | 198/594 |
| 8,038,558 B2 * | 10/2011 | Klabisch et al. | 474/155 |
| 2002/0074214 A1 | 6/2002 | Klabisch et al. | |
| 2003/0010604 A1 | 1/2003 | Schaefer et al. | |
| 2005/0170924 A1 * | 8/2005 | Meya et al. | 474/155 |
| 2015/0027858 A1 * | 1/2015 | Brotzmann et al. | 198/850 |

FOREIGN PATENT DOCUMENTS

| | | |
|---|---|---|
| DE | 19721201 B4 | 4/2006 |
| DE | 10 2006 01445 A1 | 10/2007 |
| DE | 102010013476 A1 | 5/2012 |
| EP | 1688374 A1 | 9/2006 |
| WO | WO 98/40292 A1 | 9/1998 |

OTHER PUBLICATIONS

International Search Report mailed Mar. 17, 2015, in Application No. PCT/EP2013/003096 by European Patent Office (3 pages).
U.S. Appl. No. 14/439,378 of Robert Voigt titled "Tensible Return Unit for Apron Conveyor" filed on Apr. 29, 2015.

* cited by examiner

continues

CHAIN WHEEL FOR APRON CONVEYOR

CLAIM FOR PRIORITY

This application is a U.S. National Phase entry under 35 U.S.C. §371 from PCT International Application No. PCT/EP2013/003104, filed Oct. 15, 2013, which claims benefit of priority of German Patent Application No. 202012104212.6, filed Nov. 2, 2012, all of which are incorporated herein by reference.

TECHNICAL FIELD

The present disclosure relates to a chain wheel for driving or diverting a horizontal and vertical conveyor chain of an apron conveyor (slat conveyor). More specifically, the present disclosure relates to a chain wheel of an apron conveyor having transport plates connected by means of a chain connecting part to the conveyor chain.

BACKGROUND

In minerals mining, such as, in particular, in underground mining, so-called scraper chain conveyors have for decades been used for material transport, in which an endless conveyor chain is provided at regular intervals with drivers, which are connected to the horizontally lying chain links, hereinafter referred to as horizontal chain links, of the conveyor chain. The conveyor chain runs at both conveyor ends around a respective chain wheel, by means of which the conveyor chain is diverted and/or driven. Both chain wheels here have teeth with uniform tooth pitch. Particularly in scraper chain conveyors, in which only one chain wheel is motor-driven whilst the other chain wheel forms a pure deflection pulley in a reversing station, the chain wheel of the reversing station, after a certain operating time, has been used in the main drive, and vice versa, in order to continue to operate the scraper chain conveyor with the same pair of chain wheels. The chain wheels are generally mounted and supported at the main drive station and at the reversing station with a substantially horizontally lying chain wheel axle, with the distance between two drivers normally amounting to a plurality of horizontal and vertical chain links. In representation of numerous such embodiments of scraper chain conveyors, reference is made to WO2007/110088 A1, having block-like horizontal chain links, or DE 43 16 753 A1, having eyelet-like chain links.

In respect of the scraper chain conveyors, scraper chain conveyors having a double-centre chain have almost totally prevailed in recent years. The driving or diversion of the conveyor chain around the chain wheel has been realized by a horizontal chain link being respectively placed with its one bend against the locating pocket on the rear flank of a first tooth and with its other bend against the front flank of the, in the direction of rotation, following tooth. At the same time, the vertical chain links engage in an interspace on the tooth to enable the next following horizontal chain link to come to bear with its front bend correspondingly against the rear side of the second tooth, and the rear bend to come to bear against the front flank of a then third tooth. Due to the play in the joints of the individual chain links with one another, each tooth may press with its locating pocket on the front flank against the bend of a horizontal chain link, which at the same time engages in the eyelet of a following vertical chain link. Hereby the vertical chain link is drawn into the tooth space and the next following horizontal chain link is drawn into the circulation around the chain wheel.

Due to the high raw material requirement, there is increasingly the desire to work even poorly accessible or, where appropriate, very low deposits. In DE 20 2012 100 777, the Applicant has proposed an apron conveyor in which the transport plates are tiltably connected to a chain connecting part, which is in turn connected to the respective horizontal chain links of a conveyor chain.

The present disclosure is directed, at least in part, to improving or overcoming one or more aspects of prior systems.

SUMMARY OF THE DISCLOSURE

According to one aspect of the present disclosure, a chain wheel for driving or diverting a conveyor chain of an apron conveyor is disclosed. The apron conveyor may include transport plates releasably connectable via a plurality of chain connecting parts to the conveyor chain. The chain wheel may comprise a chain wheel body including a lateral face, and a plurality of teeth arranged peripherally offset over the lateral face. The chain wheel may further comprise a plurality of bearing faces arranged peripherally offset over the lateral face between two adjacently situated teeth and configured to support the chain connecting parts.

According to another aspect of the present disclosure, an apron conveyor is disclosed. The apron conveyor may comprise a conveyor chain including horizontal chain links and vertical chain links. The horizontal chain links and the vertical chain links may have chain legs and chain bends. The apron conveyor may further comprise transport plates releasably connected to every xth horizontal chain link of the conveyor chain by means of a chain connecting part. The apron conveyor may further comprise a chain wheel as exemplary disclosed herein.

Other features and aspects of this disclosure will be apparent from the following description and the accompanying drawings.

BRIEF DESCRIPTION OF THE DRAWINGS

Further advantages and embodiments of a disclosed chain wheel or of an apron conveyor herewith emerge from the following description of illustrative embodiments shown schematically in the drawing, in which.

DETAILED DESCRIPTION

Figure 1:
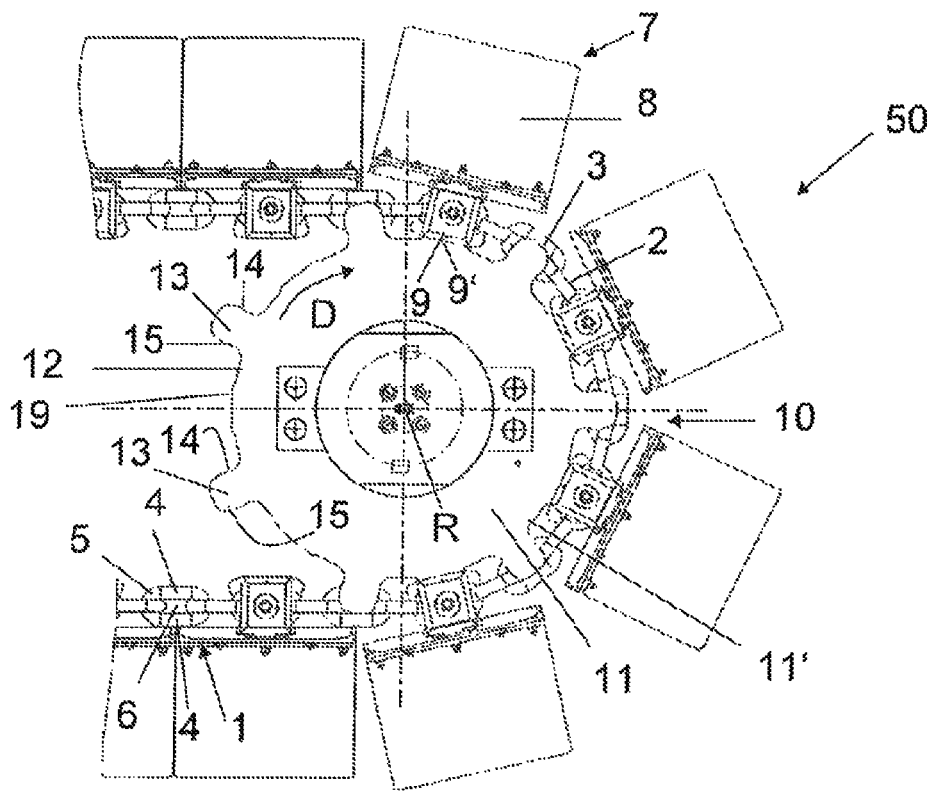
FIG. 1 shows a disclosed chain wheel, configured as a reversing chain wheel, with a turned-over conveyor chain, of an apron conveyor.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

Figure 2:
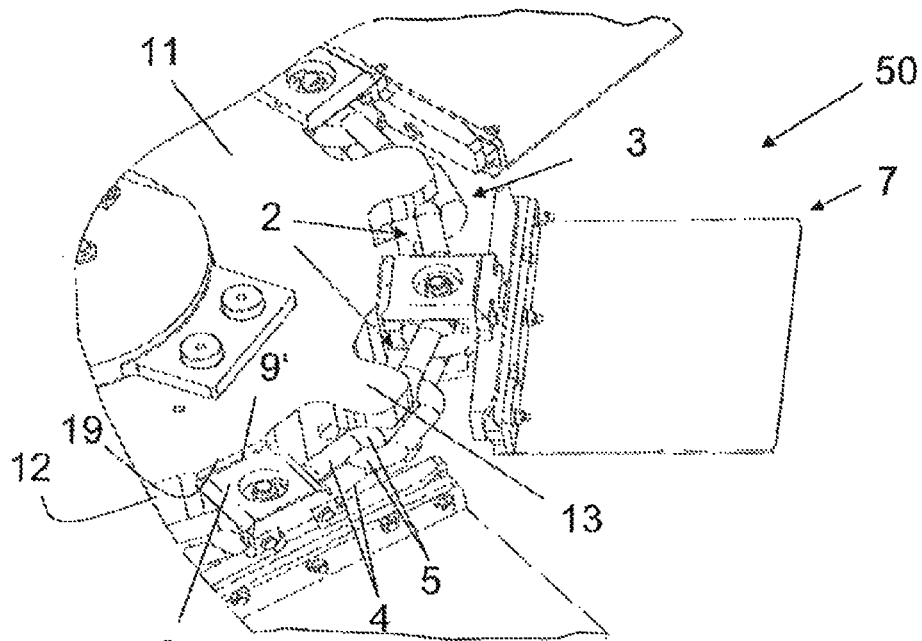
FIG. 2 shows in perspective view the chain wheel from FIG. 1, partially broken open.

Of an apron conveyor denoted in its entirety by reference numeral 50, FIGS. 1 and 2 show as a detail only one of the two chain wheels 10 for use on the so-called reversing station of the apron conveyor 50, together with the conveyor chain 1 diverted at the chain wheel 10, which conveyor chain continues as an endless chain belt of alternately arranged vertical chain links 2 and horizontal chain links 3 to a second (drive) chain wheel (not shown in FIG. 1) of the apron conveyor 50. For this purpose, the apron conveyor 50 is (likewise not represented) provided with a drive and forms the main drive for the conveyor chain 1 of the apron conveyor 50. Both the horizontal chain links 3 and the vertical chain links 2, respectively, have two mutually parallel running (chain) legs 4. The chain legs 4 are here connected to each other by an arc-shaped chain bend 5 extending over 180° and enclose an eyelet-like opening 6. Engaging articulately in the opening 6 of a vertical chain link are the bends 5 of two adjacent horizontal chain links 3, and engaging in the opening 6 of a horizontal chain link are the bends 5 of two adjacent vertical chain links 2. The conveyor chain 1 for the apron conveyor 50 is provided at regular spacing, here on every second horizontal chain link 3, with transport plates 7. The transport plates 7 do not mutually overlap and substantially consist of a plate part 8 and a rectangular, cubic chain connecting part 9. The chain connecting part 9 is horizontally divided, so as to be fastened, via a screw reaching through the opening 6 of the respectively associated horizontal chain link 3, to this said chain link. The plate part 8 is preferably connected to the chain connecting part 9 in an angularly movable manner, in order that the plate parts 8 of the transport plates 7, in a discharge region of the apron conveyor, can tilt downwards for unloading of the transport plates 7. The working method of such an apron conveyor 50 is specifically described in DE 20 2012 100 777, to which reference is made in supplementation of the present disclosure and in which the structure of the transport plates 7 with different embodiments is described in detail.

Figure 5:
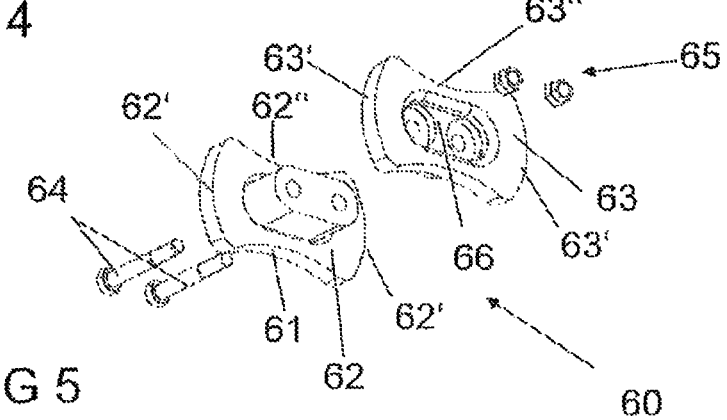
FIG. 5 shows a detailed view of a driver as a rotational-locking connection between the chain wheel and the bearing pot or drive pot.
Figure 6:
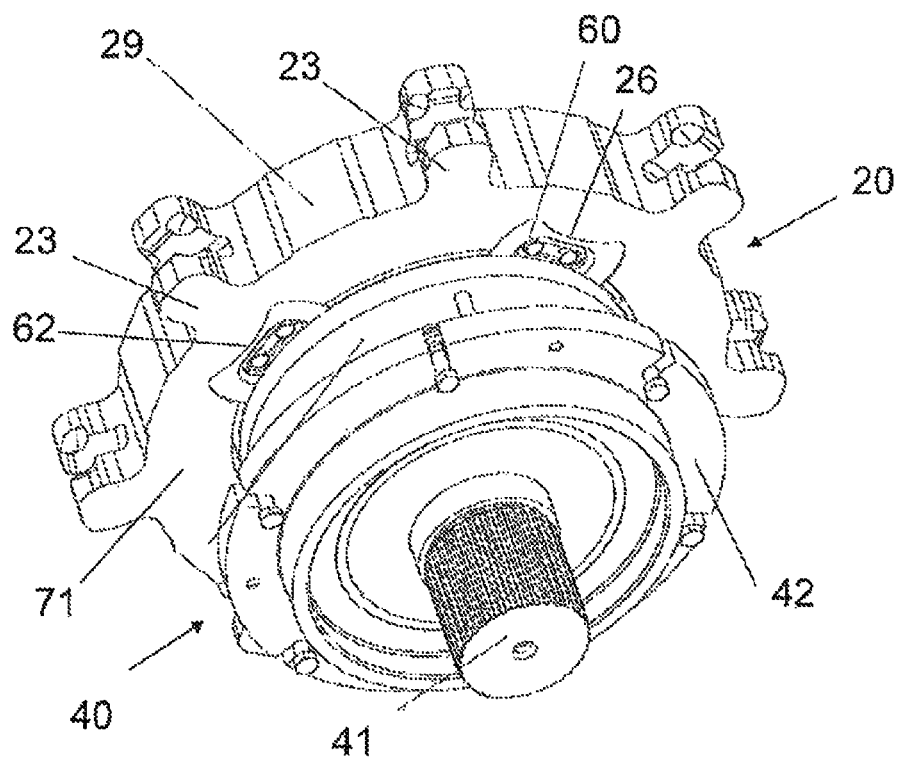
FIG. 6 shows a disclosed chain wheel with an installed bearing pot.

The chain wheel 20, which serves to drive the conveyor chain 1 and which is represented in FIG. 6, and the chain wheel 10 at the reversing station have substantially the same structure. In the preferred illustrative embodiment both chain wheels 10 and 20 differ, as is further explained, only in respect of whether the central hub of the substantially annular chain wheel body 11 of the chain wheel 10 (or 71 of the chain wheel 20 in FIG. 6) is provided with a bearing pot 30, as in the chain wheel 10, or with a drive pot 40, as in the chain wheel 20 for the main drive. The structure of the chain wheel 10 is now firstly explained with reference to FIGS. 1 to 5.

Figure 3:
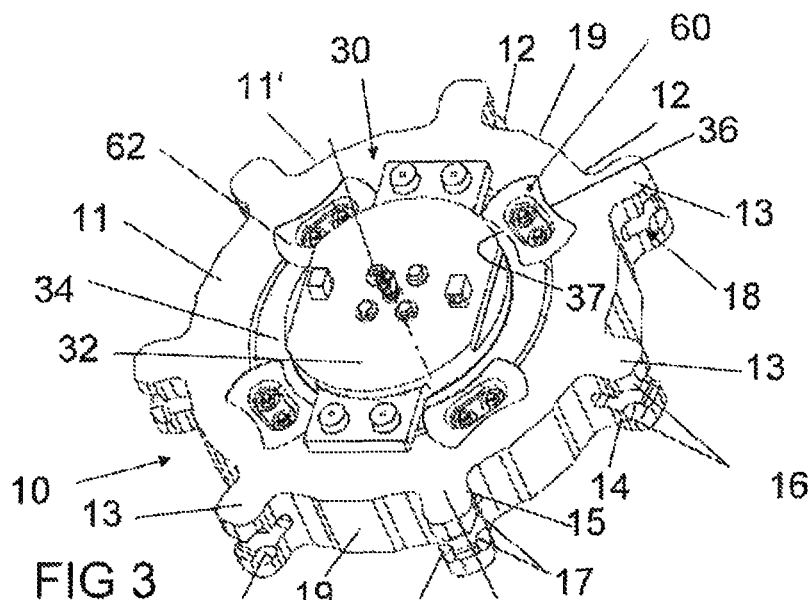
FIG. 3 shows in perspective view the chain wheel as a reversing chain wheel, without a conveyor chain.

The chain wheel body 11 of the chain wheel 10 has a relatively large diameter of, for example, approximately 100 cm or more. Distributed over the lateral face (outer periphery) 11' of the chain wheel body 11 of the chain wheel 10, seven radially projecting teeth 13 are integrally formed and arranged such that they are peripherally offset at a uniform distance apart. The direction of rotation of the chain wheel 10 about the central wheel axle R is indicated in FIG. 1 with the arrow D. Each tooth 13 has, related to the direction of rotation D, a front tooth flank 14 and a rear tooth flank 15. A rear tooth flank 15 of a first tooth 13 lies directly opposite a front flank 14 of a second tooth 13, related to the direction of rotation. On each of these tooth flanks 14, 15, as clearly shown by FIGS. 2 and 3, are formed locating pockets 16 or 17, against which, in the apron conveyor 50, the bends 5 of vertical chain links 2 come to bear, whilst the bends 5 of the horizontal chain links 3 do not enter at all into rotationally locking contact with the chain wheel body 11 of the chain wheel 10. Rather, an inner leg(s) 4 of every second horizontal chain link 3 intrudes into a cutout 18 in the middle of each tooth 13. The cutout 18 divides each tooth 13 or each pocket 16, 17 into two tooth halves or pocket halves. The bend 5 of the respectively adjoining vertical chain link 2 partially has contact with the locating pockets 16 or 17 on both tooth halves.

FIGS. 1 to 3 further show that there is a relatively large distance between two teeth 13. Between two teeth 13 on the lateral face 11' of the chain wheel body 11, a flattening 19 is formed, which, in the shown illustrative embodiment, extends as a plane, rectangular face tangentially to the wheel axle R. This flattening 19 forms a plane bearing face for a rear end face 9' on each chain connecting part 9, whereby the chain connecting part 9 of each transport plate 7 can respectively come to bear between two teeth 13 against the lateral face 11' of the chain wheel body 11 of the chain wheel 10. This bearing contact between the chain connecting part 9 and the chain wheel 10 ensures a peripherally constant spacing of the horizontal chain link 3 connected to the respective chain connecting part 9. The horizontal chain link 3 connected to the chain connecting part 9, neither at the chain wheel 10 of the reversing station nor at the chain wheel 20 of the main drive, comes into contact at any time with one of the teeth 13 of the chain wheel 10. Nor, therefore, does a specific vertical chain link 2 bear with its two bends 5 against the mutually facing tooth flanks 15 of the first tooth and the tooth flank 14 of the following second tooth 13. Rather, the rear tooth flank 15 of the first tooth 13 is borne against by the front bend 5 of a first vertical chain link 2 without the chain wheel 10 being touched by the rear bend 5 of this vertical chain link. At the same time, the rear bend 5 of a second vertical chain link 2 bears against the front tooth flank 14, facing this tooth flank 15 of the first tooth 13, of the then second tooth 13. The distance between two teeth 13 hence corresponds to a chain length of approximately three chain links, namely two vertical chain links 2 and a horizontal chain link 3. Each bend 5 herein comes evenly to bear against the two pocket halves of the locating pockets 16 or 17 of the tooth halves of each tooth 13. The bearing faces 19 on the lateral face 11' of the chain wheel body 11 are slightly raised. Between each bearing face 19 and the adjacently situated tooth, a sink 12 is formed on the lateral face 11', which ensures a certain clearance contiguous to the bearing face 19. Such a sink 12 between the bearing face 19 and the contiguous tooth 13 has advantages, in particular, if, as in the illustrative embodiment shown, the chain connecting part 9 has on its flat rear side 9' a greater width in the direction of rotation than the width measurement of the bearing face 19 in the direction of rotation.

Figure 4:
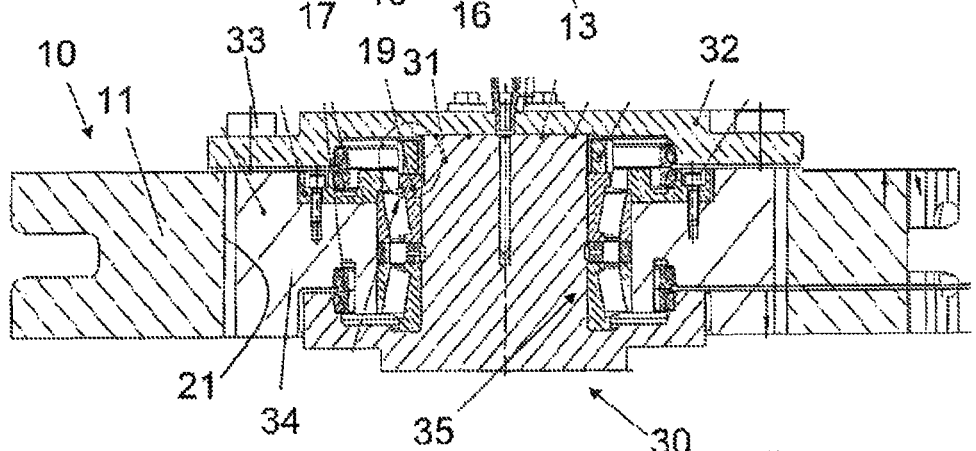
FIG. 4 shows a vertical section through the chain wheel from FIG. 3, with a fitted bearing pot.

A bearing pot 30 or a drive pot 40 can be connected in a rotationally locking manner to the annular chain wheel body 11, as represented in the introduction, according to the desired function as a chain wheel 10 of a reversing station or as a chain wheel 20 for a main drive, as is now firstly explained for the bearing pot 30 with reference, in particular, to FIGS. 3 to 5. The chain wheel body 11 is provided with a central hole 21 as the hub, in which, in the case of the chain wheel 10, the bearing pot 30 may be anchored in a rotationally locking manner. Via this bearing pot 30, a suspension of the chain wheel 10 from a reversing station (not represented) is realized by the bearing pot 30 being provided with a base support 31, to which is fastened in a rotationally secure manner a supporting plate 32. The supporting plate 32 may be connected by four pins 33 to a supporting structure (not shown) on the reversing station. At the same time, the torque may be transmitted via the pins 33 into the supporting structure of the reversing station. Between the base support 31 and the chain wheel body 11 of the chain wheel 10, a supporting ring 34 is disposed, which, by means of a rotary bearing arrangement 35, may be twisted relative to the base support 31 and to the supporting plate 32 connected thereto in a motionally fixed manner. The rotary bearing arrangement 35 is disposed between the base support 31 and the supporting ring 34 in a manner as is represented, by way of example, in FIG. 4.

Only the supporting ring 34 of the bearing pot 30 is connected in a rotationally locking manner to the chain wheel body 11 of the chain wheel 10. At the same time, the chain wheel body 11 of the chain wheel 10 is axially fixed to the supporting ring 34 of the bearing pot 30. Both the rotationally locking connection and the axial fixing between the supporting ring 34 and the chain wheel body 11 are realized by means of four peripherally offset drivers 60, which are shown in detail in FIG. 5. Each driver 60 has a driver shaft 61, a top plate 62 and a bottom plate 63, which are both releasably anchored to end faces of the driver shaft 61 by means of two bolt screws 64 and nuts 65. The driver shaft 61 has an oval basic shape. The supporting ring 34, on the one hand, and the chain wheel body 11 of the chain wheel 10, on the other hand, have at those places, at which corresponding drivers 60 are intended to be positioned, a driving cavity on the chain wheel body 11 or a driving indentation on the supporting ring 34 of the bearing pot, neither of which, however, are shown for the chain wheel 10 and in which, in the assembly state, the driver shaft 61 partially engages in such a way that it lies with the outer zone in the region of the chain wheel body 11 and with the inner zone in the region of the supporting ring 34. The force transmission between the supporting ring 34 and the chain wheel body 11 could in principle be realized via this driver shaft 61. In the illustrative embodiment shown, by contrast, the force transmission is realized essentially not via the driver shaft 61, but rather via the top plate 62 and the bottom plate 63. Both the top plate 62 and the bottom plate 63 enable a recessed reception of the heads of the screws 64 and of the nuts 65 by virtue of a central recess 66. The outer contour of bottom plate 63 and top plate 62 is identical and has essentially a figure-of-eight-shaped cross section with rounded end faces 62', 63', which are respectively convexly curved and concavely curved, and transverse sides 62", 63", which slant to the middle of the top plates 62 and of the bottom plate 63. The force transmission is realized preferably exclusively via the convexly curved end faces 62', 63', whilst the transverse sides 62", 63" serve for the exact positioning of the top plates 62 and bottom plates 63 in the associated, congruently configured partial recesses 36 in the top side and bottom side of the chain wheel body 11, and 37 in the top and bottom side of the supporting ring 34 of the bearing pot 30. As a result of the recessed arrangement both of the drivers 60, together with top and bottom plates 62, 63, and of all the screws and nuts in the chain wheel body 11, which has only a small thickness, all in all a relatively flat construction of an apron conveyor, and, at the same time, a hanging suspension of the chain wheel 10 via the supporting plate 32, may be achieved.

Figure 7:
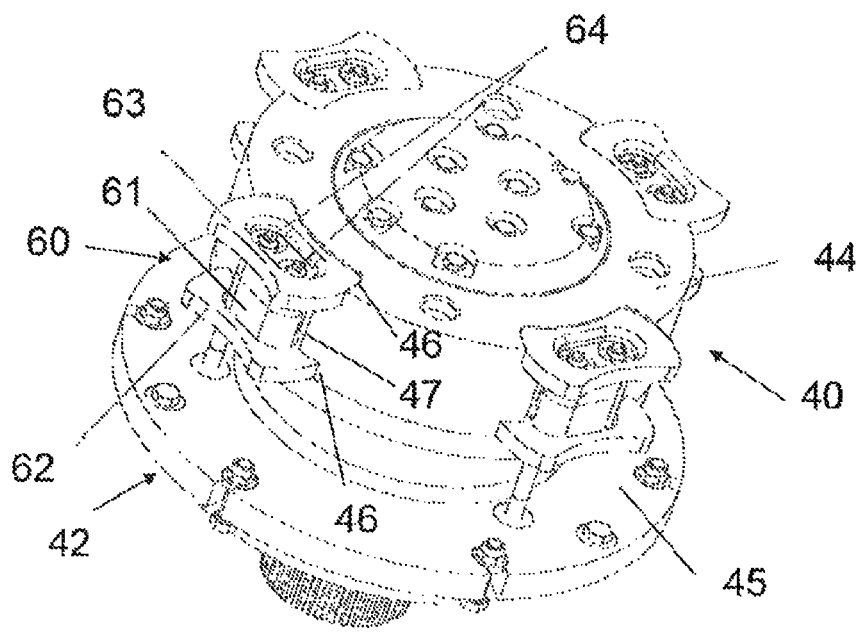
FIG. 7 shows the bearing pot according to FIG. 6 in perspective view from the rear.

FIGS. 6 and 7 show a chain wheel 20 with an inserted drive pot 40 for use in the main drive station. The chain wheel body 71 of the chain wheel 20 has an identical structure to that in the previous illustrative embodiment with an identical number of teeth 23. The teeth 23 have the same spacing and the same construction as in the chain wheel 10 for the reversing station, and also in the case of the chain wheel 20, bearing faces 29 for the end faces of the chain connecting parts are provided between the teeth. The chain wheel bodies 71 of the chain wheel 20 could also be equipped with a bearing pot and form a chain wheel at the reversing station, and vice versa. The chain wheel 20 for a main drive and the chain wheel 10 for the reversing station may be produced in the same production line and may optionally be used in one or the other station. Also the rotationally locking fastening of the bearing pot 30 is realized via the same drivers 60 as in the chain wheel 10 having bottom plates 63 and top plates 62 of corresponding basic shape, which are fastened by screws 64 to a driver shaft 61. The drive pot 40 has a splined drive shaft 41, which is rotatably mounted within a bearing housing 42, which may be correspondingly fastened in suspension mounting to the machine frame (not shown) of the main drive station via a bearing flange 45. During operation, the chain wheel 20 is positioned with vertically upright wheel axle on the machine frame. One end of the drive shaft 41, which ends inside the drive pot 40, is likewise provided with a splined toothing (not shown) and is connected there in a rotationally locking manner to a spacer ring 44. The spacer ring 44 has cutouts 46 in the top and bottom side for the top plates 62 and bottom plates 63 of the drivers 60 and is additionally provided on its periphery, for the driver shafts 61, with driving indentations 47, which form the necessary clearance for the lead-through of the driver shaft 61 of the driver 60. The bottom plates 63 and the top plates 62 engage partially with their, in each case, outer half in recesses 26 in the top and bottom side of the chain wheel body, and a force transmission from the drive pot 40 to the chain wheel 20 is preferably realized only via the top and bottom plates 62, 63 and not via the driver shaft 61 at the interface between the chain wheel body, on the one hand, and the spacer ring 44 of the bearing pot 30, on the other hand.

INDUSTRIAL APPLICABILITY

The present disclosure discloses a chain wheel for use in an apron conveyor, which chain wheel has a low overall height and is advantageously suitable, in particular, for the diversion of conveyor chains having transport plates connected by a chain connecting part.

For the achievement of this object, a chain wheel, in which, on the periphery of the chain wheel body, between two adjacently situated teeth, a bearing face for the chain connecting part may be arranged, wherein each tooth has a cutout for the recessed reception of at least one leg of a horizontal chain link, and wherein the distance between two adjacent teeth is configured such that, with fitted chain, the locating pocket on the rear tooth flank of a first tooth cooperates with the bend of a first vertical chain link, and the locating pocket on the front tooth flank, facing the first tooth, of a second tooth cooperates with the bend of a second vertical chain link. In the case of the disclosed chain wheel—other than, for example, in the prior art in respect of scraper chain conveyors—the adjacent teeth do not act upon the same chain link, nor upon that chain link which is connected to the driver that is here formed by the chain connecting part and the transport plate. Rather, the teeth act upon those two vertical chain links, which run ahead of or behind the horizontal chain link serving for the direct connection of the transport plate. The conveyor chain is driven or diverted on the chain wheel primarily by means of the vertical chain links. Since, at the same time, a bearing face for the chain connecting part, and thus the horizontal chain link, which is present there, is arranged between the two teeth, this embodiment reduces the polygon effect on the chain wheel. The corresponding chain wheel is used in apron conveyors with a vertically upright chain wheel axle, and generally exclusively as a chain wheel for a single chain. However, the chain wheel may acquire a diameter which is considerably greater than was known, in any event, in scraper chain conveyors.

According to one advantageous embodiment, a sink may be formed between the bearing face and the adjacently situated teeth on the lateral face of the chain wheel or chain wheel body. This embodiment improves the cooperation between the chain connecting part and the bearing face. Further preferably, the width dimension of the bearing face in the peripheral direction may be smaller than the width dimension of the chain connecting part, so that this, in the assembly state, protrudes slightly over the bearing face on both sides. The bearing face and the sinks to both sides thereof ensure that the radial clearance of the horizontal chain link which receives the chain connecting part is the same as in that horizontal chain link which is found in the cutout in the respective tooth. The bearing face may preferably lie tangentially to the rotational axis of the chain wheel and/or it consists of a plane face. Additionally or alternatively, the bearing face may be provided with driving grooves or driving projections for the chain connecting part. The chain wheel may consist of a one-part casting. Due to the sometimes very large construction, it may also be advantageous, however, to configure the chain wheel in two-part or, where appropriate, even in multipart construction.

The hub in the chain wheel preferably consists of a central hole, which tapers the chain wheel body to form a toothed ring, wherein, according to choice, a bearing pot provided with a mounting or a drive pot provided with a drive shaft may be inserted into the hole. This embodiment of a chain wheel for the apron conveyor may have the advantage of reducing the raw material usage for the chain wheels, since, instead of a solid disc, an annular disc may be used or cast. The second advantage herein may be that the same chain wheel can be used, according to choice, on the chain drive or on a reversing station and for this purpose it is merely necessary to fit either the bearing pot or the drive pot into the hub in the chain wheel body. Particularly in the case of very large chain wheel diameters of, for example, one meter and more, this embodiment may offer the further advantage that the bearing pot or drive pot can be produced separately from the chain wheel body, and thus on other, in particular smaller, machines, which not only simplifies and speeds up the production process, since a parallel production, too, is possible, but also enables even chain wheels of different sizes or diameters, where appropriate, to be provided with the same bearing pot or drive pot and, at the same time, even to be reused if the chain wheels are changed.

The necessary rotational locking between the bearing pot or the drive pot, on the one hand, and the hub or the chain wheel body, on the other hand, is preferably obtained by virtue of the fact that driving cavities, peripherally offset on the inner lateral face of the hole, are configured to cooperate with releasable drivers, by which driving cavities the chain wheel is or may be connected in a rotationally locking manner either to the bearing pot or to the drive pot. Since the bearing pot or the drive pot is subjected to substantially less wear than the teeth on the chain wheel body of the chain wheel, the necessary rotational locking may in this way be obtained, at the same time as production is simplified. The releasable drivers may also have a driver shaft, which engages, where appropriate in a rotationally locking manner, in driving cavities on the chain wheel body and in driving indentations on the bearing pot or on the drive pot. It is yet more advantageous if the drivers may be provided with top plates and bottom plates for axial fixing of the chain wheel to the bearing pot or drive pot, or vice versa. It is particularly advantageous if, exclusively via the drivers, preferably exclusively via the top and bottom plates, firstly the rotational locking and secondly also the axial connection between the bearing pot or drive pot, on the one hand, and the chain wheel body, on the other hand, may be obtained. At least one of the bottom plate or top plate may respectively be releasably connected to the driver shaft in order to be able to establish or release the axial connection. A particularly favourable force ratio may be obtained if the top plate and/or the bottom plate has/have an approximately figure-of-eight-shaped outer contour, and the basic body of the chain wheel, on its top side and/or bottom side, is provided with recesses for partial rotationally locking reception of the outer contour. The figure-of-eight-shaped outer contour allows cooperation between faces which are rounded in the direction of rotation, in which faces the drive torque from the respective bearing pot or drive pot is taken up on the inner half and is transmitted to the chain wheel body with the, in each case, outer half of the top plate and bottom plate. In a symmetrical embodiment of top plate and bottom plate, the bottom plates or top plates, in the event of wear, may be rotated about 180 degrees, whereby the previously load-free zones then correspondingly transmit the rotation forces. According to a preferred embodiment, four driving cavities may be formed, distributed over the inner lateral face of the hole.

In the apron conveyor, the above object is achieved by virtue of the fact that on the lateral face of the chain wheel body, between two adjacently situated teeth, a bearing face for a chain connecting part may be configured, that each tooth has a cutout for the recessed reception of at least one leg of a horizontal chain link, and that the distance between two adjacent teeth may be configured such that the locating pockets on the rear tooth flank of a first tooth cooperate with the bend of a first vertical chain link, and the locating pocket on the front tooth flank, facing the first tooth, of a second tooth cooperate with the bend of a second vertical chain link. The distance between two teeth hence may correspond to the chain length of substantially three chain links, namely two vertical chain links and a horizontal chain link disposed therebetween, whilst the following horizontal chain link may reach respectively through the cutout in the respective tooth without absorbing forces in the direction of rotation.

The chain wheel in a corresponding apron conveyor is preferably configured as described further above. In particular, it is advantageous if the chain connecting part may be connected to every second horizontal chain link, hence respectively horizontal and vertical chain links follow one upon the other, wherein a chain connecting part, and thus a transport plate, may be connected respectively only to every second horizontal chain link. In this case, it is particularly expedient if the transport plates may be tiltably connected to the chain connecting part, since then the unloading of the transport plates can be effected by vertical tilting of the transport plate relative to the chain connecting part.

For the person skilled in the art, numerous modifications which should fall within the scope of the attached claims emerge from the preceding description. The size and number of the teeth of the chain wheel and the spacing may vary in dependence on, for example, the chain links used. The bearing faces for the chain connecting parts may also be provided, where appropriate, with grooves, recesses or the like in order to influence the contact behaviour and transport behaviour between the transport plates or their chain connecting parts, on the one hand, and the chain wheel, on the other hand. Both chain wheels may also be provided with a drive pot, in case, for example, a drive station may be disposed at both ends of the apron conveyor. If need be, the locating pockets for the chain wheels may be provided or hardened with a wear protection, in order to extend the working life of the chain wheels. The same may apply to the bearing face. The chain wheel body may also be divided in order to facilitate production in spite of very large chain wheel diameters.

Although the preferred embodiments of this invention have been described herein, improvements and modifications may be incorporated without departing from the scope of the following claims.

The invention claimed is:

1. A chain wheel for driving or diverting a conveyor chain of an apron conveyor including transport plates releasably connectable via a plurality of chain connecting parts to the conveyor chain, the chain wheel comprising:
   a chain wheel body including a lateral face;
   a plurality of teeth arranged peripherally offset over the lateral face; and
   a plurality of bearing faces arranged peripherally offset over the lateral face between two adjacently situated teeth and configured to support the chain connecting parts.

2. The chain wheel according to claim 1, wherein the conveyor chain includes vertical and horizontal chain links and the transport plates are releasably connectable via a plurality of chain connecting parts to every xth horizontal chain link of the conveyor chain, and the teeth of the chain wheel include:
   front tooth flanks provided with locating pockets for chain bends of the chain links;
   rear tooth flanks provided with locating pockets for the chain bends of the chain links; and
   a cutout configured for the recessed reception of at least one leg of a horizontal chain link,
   wherein the distance between two adjacent teeth is configured such that the locating pocket on the rear tooth flank of a first tooth cooperates with a chain bend of a first vertical chain link of a fitted conveyor chain, and the locating pocket on the front tooth flank, which faces the first tooth, of a second tooth cooperates with a chain bend of a second vertical chain link of a fitted conveyor chain.

3. The chain wheel according to claim 1, further comprising a plurality of sinks arranged peripherally offset over the lateral face between adjacently situated bearing face and tooth.

4. The chain wheel according to claim 1, wherein a width dimension of the bearing face in the peripheral direction of the chain wheel is smaller than a width dimension of the chain connecting part.

5. The chain wheel according to claim 1, wherein the bearing face lies tangentially to a rotational axis of the chain wheel.

6. The chain wheel according to claim 1, wherein the bearing face consists of a plane face.

7. The chain wheel according to claim 1, wherein the bearing face is provided with driving grooves or driving projections for the chain connecting part.

8. The chain wheel according to claim 1, wherein the chain wheel body is formed as a ring with teeth, and comprises a central hub consisting of a central hole which is configured such that, according to choice, a bearing pot provided with a mounting or a drive pot provided with a drive shaft is insertable into the hole.

9. The chain wheel according to claim 8, further comprising driving cavities arranged peripherally offset on the inner lateral face of the hole to cooperate with releasable drivers which are connectable in a rotationally locking manner either to the bearing pot or to the drive pot.

10. The chain wheel according to claim 9, wherein the releasable drivers include a driver shaft to engage in the driving cavities on the chain wheel body and to engage in driving indentations on the bearing pot or on the drive pot.

11. The chain wheel according to claim 8, wherein the releasable drivers are provided with top plates and bottom plates for axial fixing of the chain wheel to the bearing pot or the drive pot.

12. The chain wheel according to claim 11, wherein the bottom plates and/or the top plates are releasably connected to the driver shaft.

13. The chain wheel according to claim 11, wherein the bottom plates and/or the top plates include an approximately figure-of-eight-shaped outer contour, and recesses are provided on a top side and/or a bottom side of the chain wheel body for partial rotationally locking reception of the outer contour.

14. The chain wheel according to claim 8, wherein four driving cavities are arranged offset over the inner lateral face of the hole in the chain wheel body.

15. An apron conveyor comprising:
   a conveyor chain including horizontal chain links and vertical chain links, the horizontal chain links and the vertical chain links having chain legs and chain bends;
   transport plates releasably connected to every xth horizontal chain link of the conveyor chain by means of a chain connecting part; and
   a chain wheel, including:
      a chain wheel body including a lateral face;
      a plurality of teeth arranged peripherally offset over the lateral face; and
      a plurality of bearing faces arranged peripherally offset over the lateral face between two adjacently situated teeth and configured to support the chain connecting parts.

16. The apron conveyor according to claim 15, wherein the chain connecting part is connected to every second horizontal chain link.

17. The apron conveyor according to claim 15, wherein the transport plates have plate parts tiltably connected to the chain connecting part.

18. The apron conveyor according to claim 15, wherein the teeth of the chain wheel include:
   front tooth flanks provided with locating pockets for chain bends of the chain links;
   rear tooth flanks provided with locating pockets for the chain bends of the chain links; and
   a cutout configured for the recessed reception of at least one leg of a horizontal chain link,
   wherein the distance between two adjacent teeth is configured such that the locating pocket on the rear tooth flank of a first tooth cooperates with a chain bend of a first vertical chain link of a fitted conveyor chain, and the locating pocket on the front tooth flank, which faces the first tooth, of a second tooth cooperates with a chain bend of a second vertical chain link of a fitted conveyor chain.

19. The apron conveyor according to claim 15, further comprising a plurality of sinks arranged peripherally offset over the lateral face between adjacently situated bearing face and tooth.

20. The apron conveyor according to claim 15, wherein a width dimension of the bearing face in the peripheral direction of the chain wheel is smaller than a width dimension of the chain connecting part.

* * * * *